Aug. 18, 1936.  S. D. GOLDBERG  2,051,349
DEVICE FOR PRESERVING LOCAL ANESTHETIC SOLUTIONS
Filed May 10, 1935
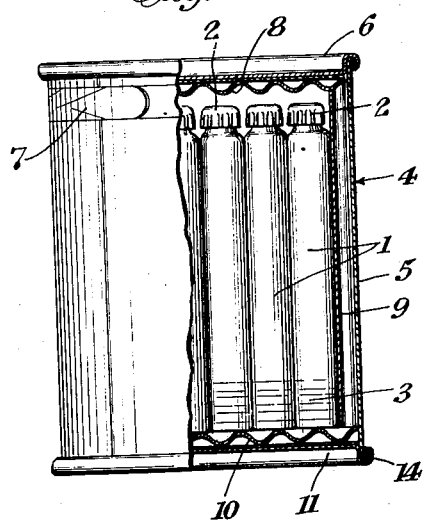
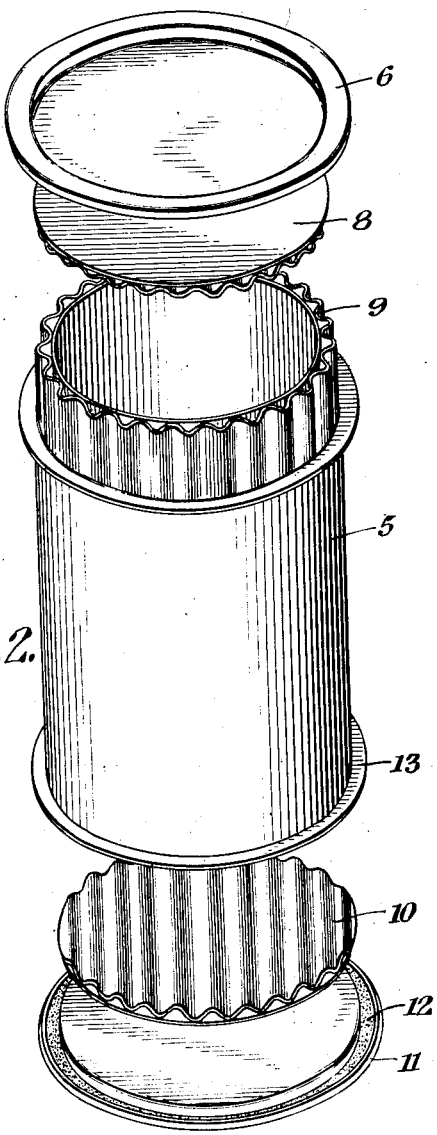
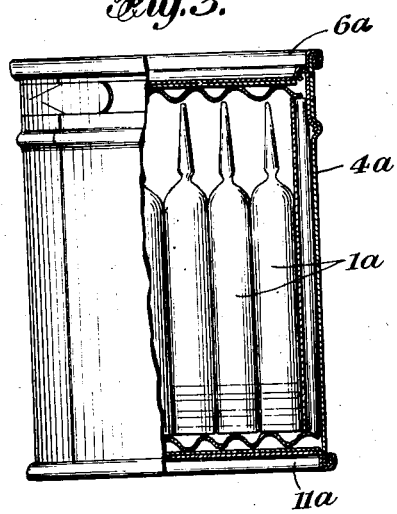
INVENTOR
Samuel D. Goldberg
BY
his ATTORNEYS Patented Aug. 18, 1936

2,051,349

UNITED STATES PATENT OFFICE 2,051,349

DEVICE FOR PRESERVING LOCAL ANESTHETIC SOLUTIONS

Samuel D. Goldberg, Brooklyn, N. Y., assignor to Novocol Chemical Mfg. Co. Inc., Brooklyn, N. Y., a corporation of New York Application May 10, 1935, Serial No. 20,733

3 Claims. (Cl. 206—63.2)

This invention relates to a device for preserving of local anesthetics which have a tendency to decompose, and more particularly solutions of local anesthetics which are used for hypodermic injection.

As is well known in this art, it is customary to dispense such liquids in containers which are adapted to be inserted in hypodermic syringes provided for this purpose. These containers comprise a receptacle body of glass or the like, which in the usual embodiment is of general cylindrical form; one end being closed by a piston or the like frictionally held in engagement in one end, and the other end being provided with a fixed seal of suitable form, effected either by fusing the extended end of the glass tube, as in an ampule, or by a cap of a character to effect a suitable seal in the case of a cartridge. Both forms will be designated in the claims and elsewhere generally by the term cartridge.

There are two general types of local anesthetic solutions in cartridges on the market today. The older of these two types has a relatively high acidity. The newer type contains a substance which has been added to neutralize the acidity thereof and buffer it. Both types of solutions contain epinephrin or similar material and accordingly are susceptible to change through oxidation of the epinephrin. Both solutions are considered to be substantially stable if they have a life of one year or so when kept in storage under normal conditions such as we have in the United States. In those parts of the United States where high temperatures are apt to remain over long periods, the tendency is for decomposition to occur more rapidly than with lower temperature conditions. A period up to twelve months allows the goods to be packed and shipped to various parts of the United States and to remain on the shelves or in a practitioner's office for several months without noticeable decomposition occurring. If decomposition does occur, it is usually evidenced by the fact that the solution turns brown and practitioners ordinarily do not use cartridges containing brown solutions. The consequence is that with both types of solutions there is a considerable return to the manufacturer of cartridges considered unfit for use because of the decomposition of the epinephrin. For the United States this return is relatively smaller than for shipments to foreign countries, particularly countries where high temperatures prevail for considerable portions of the year. The resulting waste in such returned goods is a serious factor in industry, averaging from about 5 to 10% of the total for local distribution and sometimes as high as 50% of foreign distribution and export trade. In addition to the loss because of the necessity of replacement of the goods themselves, there is the return transportation cost of the material.

Despite this substantial and well-recognized loss, no one heretofore has been able to solve this problem. I have found that despite the fairly tight frictional engagement of the piston seal, nevertheless there is an oxidizing action which takes place, to the detriment of the liquid. One reason for this I attribute to the air penetrating between the rubber piston and the inner wall of the glass tube with which it comes in contact. This is facilitated by the grooves in the rubber pistons. These grooves are initially filled with glycerin or other lubricant to facilitate the smooth moving of the piston in expelling the liquid from the cartridge, but this lubricant is eventually absorbed by the rubber, thus allowing or inducing its replacement by air. There may be other reasons, but in any event air gradually finds its way into the contents of such cartridge and gradually oxidizes the solution, breaking up its chemical constituency, and making it unfit for use, as evidenced by discoloration and disintegration. I have found that by excluding the air from the containers where the cartridges are placed, the discoloration and precipitation are prevented. I have also found that the important thing is to have a hermetically sealed container. In such cases the small quantity of oxygen in the container can easily be taken care of by the antioxidant which is present in the solution, the remaining nitrogen in the air of the container acting thereafter as an inert gas, preventing further oxidation and discoloration.

An object of this invention is to provide means for the inhibition of oxidation of such liquids when dispensed in such receptacles.

The invention consists in the novel features, arrangements and combination of parts embodied by way of example in the device hereinafter described as illustrating a preferred form of the invention, and the invention will be more particularly pointed out in the appended claims.

Further objects, features and advantages of the invention will appear from the following specification and claims, taken in connection with the accompanying drawing, in which Fig. 1 is a view of my device in elevation, with a portion of the container broken away to show the receptacles or cartridges positioned therein, Fig. 2 is a perspective view showing various component parts of the container, and Fig. 3 shows a modified form of the structure illustrated in Fig. 1.

Referring to the drawing, and more particularly to Fig. 1, a cartridge is designated as 1, comprising in general a cylindrical tubular glass body provided with a fixed closure 2 of a permanent nature and serving to provide a hermetic seal but capable of being pierced by a needle when in use in a hypodermic syringe, in the manner well understood in the art. The lower end of the tube is closed by means of a piston 3 of rubber, which according to the usual practice is provided with one or more annular grooves, in which is placed a small quantity of glycerin or other lubricant. A plurality of such cartridges are placed in an impermeable container such as 4 which is sealed.

In the present embodiment, this container is in the form of a metal can 5 having an integrally formed end 6 provided with readily severable portion 7 adapted to be removed with the usual key opener to detach the end 6; the body 5 and end 6 being integrated before packaging occurs. With the container in inverted position, suitable lining such as the corrugated disc 8 and liner wall 9 are first inserted and then the cartridges 1 are packed therein as illustrated, and a second disc 10 is placed over the other end of the cartridges.

In order to insure the absence of a reactive gas from the container, I preferably evacuate the same and apply the cover 11 so that the sealing ring 12 engages the rim or flange 13 of the body to provide a hermetic seal, thereafter rolling over the contiguous edges to form a locking bead 14 which retains the parts in sealed relationship. In the alternative, subsequent to evacuation, an inert gas, such as carbon dioxide or nitrogen, at atmospheric pressure may be introduced.

I have found that by heating the can containing the cartridges, such as by placing in circulating hot water, and then applying the end 11 and hermetically sealing the same, a satisfactory partial vacuum may be produced.

I have further found that it is not necessary to vacuumize the cans but that where by far the greater bulk of the air in the container is displaced by the aggregate volume of the cartridges, and the container is sealed in such manner as to preclude the admission of fresh air, the small amount of air remaining does not contain a reactive gas, such as oxygen, in a quantity sufficient to cause such absorption by the liquid as will result in appreciable discoloration or otherwise deleteriously affect the liquid.

By actual tests I have demonstrated that goods packed as above described have entirely withstood discoloration when subjected to the same conditions and aging as identical goods which have discolored to such extent as to be unfit for use. To demonstrate this, I have carried out accelerated aging tests with cartridges placed in cans according to my invention and maintained at elevated temperatures, in comparison with cartridges which have not been packed according to my invention. I have found that cartridges packed according to my invention have up to the present time lasted three to four times as long as those not so packed. I estimate that these accelerated aging tests indicate a life for packages according to my invention of about two to three years accordingly. I have no means of knowing at the present time about how much longer these cartridges will remain undecomposed in my containers, but I judge that it will be for a considerably longer period than that so far indicated.

In Fig. 3 I have shown a modification as to both the cartridges and container. The cartridges 1a in this embodiment are in the form of ampules, the upper seal of which is provided by fusing an extended portion of the glass tubular body; the lower seal being sealed in the manner as previously described. The container illustrated in this embodiment, while being of slightly different construction adjacent the upper end, is in general of substantially the same type as that heretofore described. In the modified form the end 6a is sealed to the body 4a prior to the insertion of the linings and cartridges 1a; and thereafter the opposite end 11a is positioned and attached as previously described with reference to Fig. 1.

Having thus described my invention with particularity with reference to its preferred form, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. In a package of the kind described, in combination, a plurality of glass receptacles containing anesthetic liquid comprising a vaso-constrictor subject to decomposition upon oxidation, each of said receptacles having one end closed by a piston having the characteristics of rubber slidably positioned within the receptacle, sealing the receptacle sufficiently to prevent leakage of said liquid content but insufficient to prevent leakage of air therepast to decompose said liquid, and an outer container hermetically sealing said receptacles to prevent sufficient leakage of air to cause such decomposition.

2. In a package of the kind described, in combination, a plurality of glass cartridges containing anesthetic liquid comprising epinephrin subject to decomposition and discoloration upon oxidation, each of said cartridges having one end closed by a rubber piston slidably positioned within the cartridge, sealing the cartridge sufficiently to prevent leakage of said liquid content but insufficient to prevent leakage of air therepast to decompose said liquid, and an outer container hermetically sealing said cartridges containing air under reduced pressure in insufficient quantity for leakage into said cartridges to cause such decomposition.

3. In a package of the kind described, in combination, one or more glass or like translucent receptacles permitting inspection of the interior contents thereof, containing anesthetic liquid comprising a vaso-constrictor subject to decomposition upon oxidation, each of said receptacles having one end closed by a piston having the characteristics of rubber slidably positioned within the receptacle, sealing the receptacle sufficiently to prevent leakage of said liquid content but insufficient to prevent leakage of air therepast to decompose said liquid, packed in a hermetically sealed container to prevent sufficient leakage of air to cause such decomposition.

SAMUEL D. GOLDBERG.